(12) United States Patent
Ma

(10) Patent No.: US 8,006,006 B2
(45) Date of Patent: Aug. 23, 2011

(54) SYSTEM AND METHOD FOR AGGREGATING TRANSMIT COMPLETION INTERRUPTS

(75) Inventor: Xiuling Ma, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 334 days.

(21) Appl. No.: 12/142,385

(22) Filed: Jun. 19, 2008

(65) Prior Publication Data

US 2009/0319733 A1     Dec. 24, 2009

(51) Int. Cl.
  *G06F 3/00*      (2006.01)
  *G06F 15/173*    (2006.01)
(52) U.S. Cl. ............ 710/48; 710/29; 710/52; 709/223; 709/238
(58) Field of Classification Search .................. None
   See application file for complete search history.

(56) References Cited

U.S. PATENT DOCUMENTS

| | | | |
|---|---|---|---|
| 6,189,067 B1 | 2/2001 | Lowe et al. | |
| 6,467,008 B1 | 10/2002 | Gentry et al. | |
| 7,167,926 B1 | 1/2007 | Boucher et al. | |
| 7,213,094 B2* | 5/2007 | Edirisooriya et al. | 710/310 |
| 7,254,654 B1* | 8/2007 | Davis et al. | 710/52 |
| 2003/0212473 A1* | 11/2003 | Vandevanter | 700/293 |
| 2005/0078708 A1 | 4/2005 | Bender et al. | |
| 2005/0080945 A1 | 4/2005 | Carroll et al. | |
| 2005/0232274 A1* | 10/2005 | Kadambi et al. | 370/392 |
| 2006/0182039 A1 | 8/2006 | Jourdain et al. | |

OTHER PUBLICATIONS

Gervais, Joe "TCP Offload Engine Speeds Processing" Network World, Jul. 7, 2003, p. 27.

* cited by examiner

*Primary Examiner* — Alan Chen
(74) *Attorney, Agent, or Firm* — King & Spalding LLP

(57) ABSTRACT

Systems and methods for aggregating transmit completion interrupts for multiple packets are provided. A network device can include a buffer with multiple memory locations capable of temporarily storing a packet being transmitted across the network via the network device and nodes connected to the network device. The network device can include a high watermark for determining when to process transmit completion interrupts. If the number of packets stored in the memory exceeds the high watermark, an aggregated transmit completion interrupt for all of the packets can be processed. Otherwise, the network device waits until sufficient packets are received to reach the high watermark.

20 Claims, 3 Drawing Sheets

SYSTEM AND METHOD FOR AGGREGATING TRANSMIT COMPLETION INTERRUPTS

FIELD OF THE INVENTION

The present disclosure relates generally to a method and system for aggregating transmit completion interrupts in a network device driver.

BACKGROUND

Network devices such as network interface cards (NICs), routers, switches, hubs, and the like generally communicate across a network by transmitting and receiving packets. Packets are units of data transmitted over a network. Network communications are often broken into packets because network devices often can only transmit small units of data, and therefore, transmitting a large amount of data over a network may be facilitated by dividing the data into related packets to be transmitted.

When a network device sends a packet, the packet will be stored in the memory of the host until it has successfully been sent out to the wire (i.e., over the network) or received by the receiving remote node. The network device generates an interrupt to notify the processor of the network device that the packet has been delivered to the receiving remote host. The interrupt handler on the host releases the memory buffer for that packet. When a network device receives a packet, the packet will be stored in the memory until the receiving node delivers this packet to the destination receiving node. Then, the network device may generate an interrupt to notify the receiving interrupt handler to process this packet. The receiving process may release the packet memory buffer after processing that packet for a new incoming packet.

Many network devices have a limited sending or receiving ring (also called a "queue") in which to temporarily store data associated with packets. For example sending and receiving rings can be multi-cell arrays that include memory references to different packets stored in the memory. If the limited send or receiving ring happens to be full, then the network device will not be able to send or receive a subsequent packet. The subsequent packets will be dropped (i.e., will fail to be sent or received by the network device), thereby impacting the network performance. In this case, these packets need to be retransmitted so that they can be sent or received by the network device. The transmit or receive completion interrupts can cause network communications to slow down because they induce significant context switch overhead between executing transmitting or receiving processes and processing interrupts. Specifically, when a network device is executing transmit or receive completion interrupts, the transmitting and receiving processes temporarily stop for the processor to process these interrupts. This can cause significant processor utilization, and could temporarily prevent packets from being sent or received by the network device, thereby slowing down the network throughput.

Therefore, what is needed are systems and methods for aggregating transmit or receive completion interrupts for multiple packets, thereby reducing the amount of time the communications are interrupted, increasing network throughput, reducing the processor utilization of the node, and utilizing cache locality by aggregating a group or "chunk" of packets to be released at once from the host.

SUMMARY

The invention provides systems and methods for aggregating transmit or receive completion interrupts for multiple packets. The invention can utilize a buffer for storing multiple packets, and can process transmit or receive completion interrupts for multiple packets at the same time, instead of sequentially and/or individually.

In one aspect, the invention can include a method for aggregating transmit completion interrupts for a network device. The method can include the steps of storing a first packet in a host memory for a network device, the network device having a high watermark; sending the first packet from a host on a network; and determining a number of packets stored in the memory; comparing the number of packets stored in the memory to the high watermark. If the number of packets stored in the memory is greater than or equal to the high watermark, the network device can generate an aggregated transmit completion interrupt for all packets stored in the memory to be processed by an interrupt handler for the network device and releasing the memory associated with all packets at one time. If the number of packets stored in the memory is less than high water mark, the network device can wait for additional packets to be sent from the host.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

The invention can comprise a computer program, such as firmware and/or a network device driver, that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Figure 1:
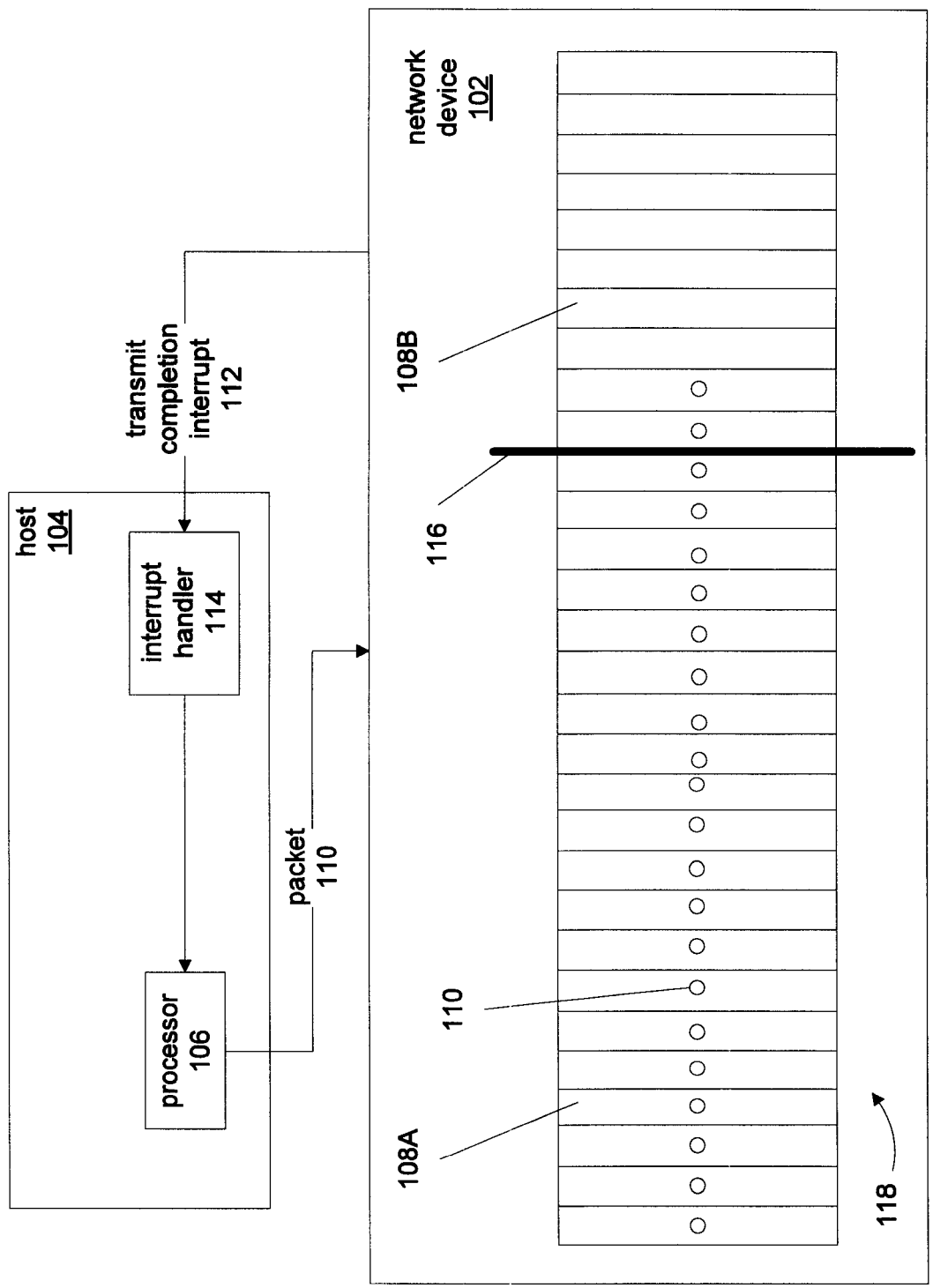
FIG. 1 is a block diagram depicting a system for aggregating transmit completion interrupts, according to an exemplary embodiment.

A method and system for aggregating transmit completion interrupts will now be described with reference to FIGS. 1-3, which depict representative or illustrative embodiments of the invention. FIG. 1 is a block diagram depicting a system for aggregating transmit completion interrupts 112, according to an exemplary embodiment. The exemplary system includes a network device 102 connected to a host 104. The network device 102 is in communication with the host 104, and can receive and transmit data to and from the host 104. Collectively, the host 104, the network device 102, and the connection therebetween can constitute a portion of a network. In various exemplary embodiments, the network that includes the host 104 and the network device 102 can include any suitable network protocol, as will be recognized by one of ordinary skill in the art having the benefit of the present disclosure. Examples of suitable network protocols that can be used include TCP/IP, Ethernet, and InfiniBand(R) protocols.

In exemplary embodiments, the network device 102 can include a NIC, router, hub, switch, or any other suitable network device 102 capable of communicating with network nodes. The network device 102 includes a ring buffer 118 as part of a memory. As shown, the ring buffer 118 can be an array divided (whether virtually or physically) into a plurality of sections, each section capable of temporarily storing information relating to a packet 110. In a particular exemplary embodiment, the ring buffer 118 can include a memory and an array of pointers that keep track of different locations in the memory, with each pointer tracking the location where one packet 110 will be stored. For example, the ring buffer 118 can include a 64-cell array, having 64 pointers to locations for temporarily storing 64 packets 110 in the host's 104 memory. As shown in FIG. 1, the ring buffer 118 can include a number of full cells 108A (i.e., array cells 108 with pointers to memory locations storing packets 110) and a number of empty cells 108B (i.e., array cells 108 with pointers to memory locations not storing packets 110).

In an exemplary embodiment, the network device 102 also can utilize a "high watermark" 116. The high watermark 116 can serve as a threshold or criterion for determining when to trigger a transmit completion interrupt 112 for one or more packets 110. When the number of full cells 108A meets or exceeds the high watermark 116 threshold, the processor 106 of the network device 102 can process the transmit completion interrupts 112 for every packet 110 stored in the memory 118, and then free the memory 118 locations associated with all packets 110. Thus, according to this embodiment, the transmit completion interrupts 112 for multiple packets 110 can be aggregated into one transmit completion interrupt 112. This can reduce the overhead—in terms of time and/or resources—that may be used to process the transmit completion interrupts 112 for the packets 110, thereby improving network speed.

In an exemplary embodiment, the host 104 includes a processor 106. The processor 106 of the host 104 can transmit the packets 110, communicate with the host 104, and determine whether the high watermark 116 has been reached. The host 104 also includes an interrupt handler 114 in communication with the processor 106 and the network device 102 for processing transmit completion interrupts 112 when appropriate. The structure depicted in FIG. 1 will be discussed in more detail with reference to the method illustrated in FIG. 3.

Figure 2:
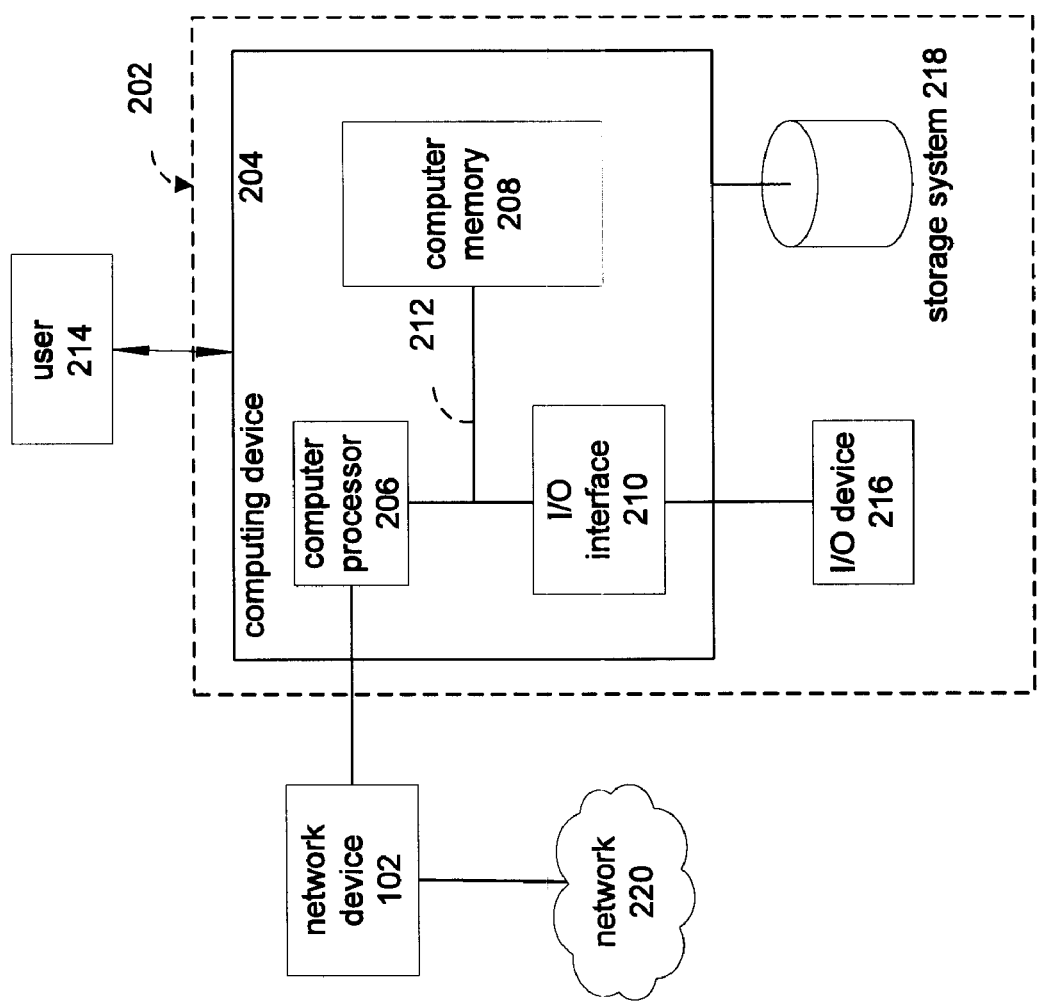
FIG. 2 is a block diagram depicting a computer utilizing a network device to communicate a network, according to an exemplary embodiment.

FIG. 2 is a block diagram depicting a computer 204 utilizing a network device 102 to communicate with a network 220, according to an exemplary embodiment. As shown, a network device 102, such as the network device 102 shown in FIG. 1, can connect a computer 204 to a network 220, such as the Internet. The invention can take the form of an entirely hardware embodiment, an entirely software embodiment or an embodiment containing both hardware and software elements. In a preferred embodiment, the invention is implemented in software, which includes but is not limited to firmware, drivers, resident software, microcode, etc.

Furthermore, the invention can take the form of a computer program product accessible from a computer-usable or computer-readable medium 212 providing program code for use by or in connection with a computer 204 or any instruction execution system. For the purposes of this description, a computer-usable or computer readable medium 212 can be any apparatus that can contain, store, communicate, propagate, or transport the program for use by or in connection with the instruction execution system, apparatus, or device.

The medium 212 can be an electronic, magnetic, optical, electromagnetic, infrared, or semiconductor system (or apparatus or device) or a propagation medium 212. Examples of a computer-readable medium 212 include a semiconductor or solid state memory 208, magnetic tape, a removable computer 204 diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system 202 suitable for storing and/or executing program code will include at least one processor 206 coupled directly or indirectly to memory 208 elements through a system bus. The memory 208 elements can include local memory 208 employed during actual execution of the program code, bulk storage 218, and cache memories which provide temporary storage of at least some program code in order to reduce the number of times code must be retrieved from bulk storage 218 during execution.

Input/output or I/O interfaces 210 and/or devices 216 (including but not limited to keyboards, displays, pointing devices, etc.) can be coupled to the system either directly or through intervening I/O controllers, and can receive input from users 214 and present output to users 214.

Network devices 102 may also be coupled to the system to enable the data processing system to become coupled to other data processing systems or remote printers or storage devices through intervening private or public networks 220. Modems, cable modem and Ethernet cards are just a few of the currently available types of network devices 102.

Figure 3:
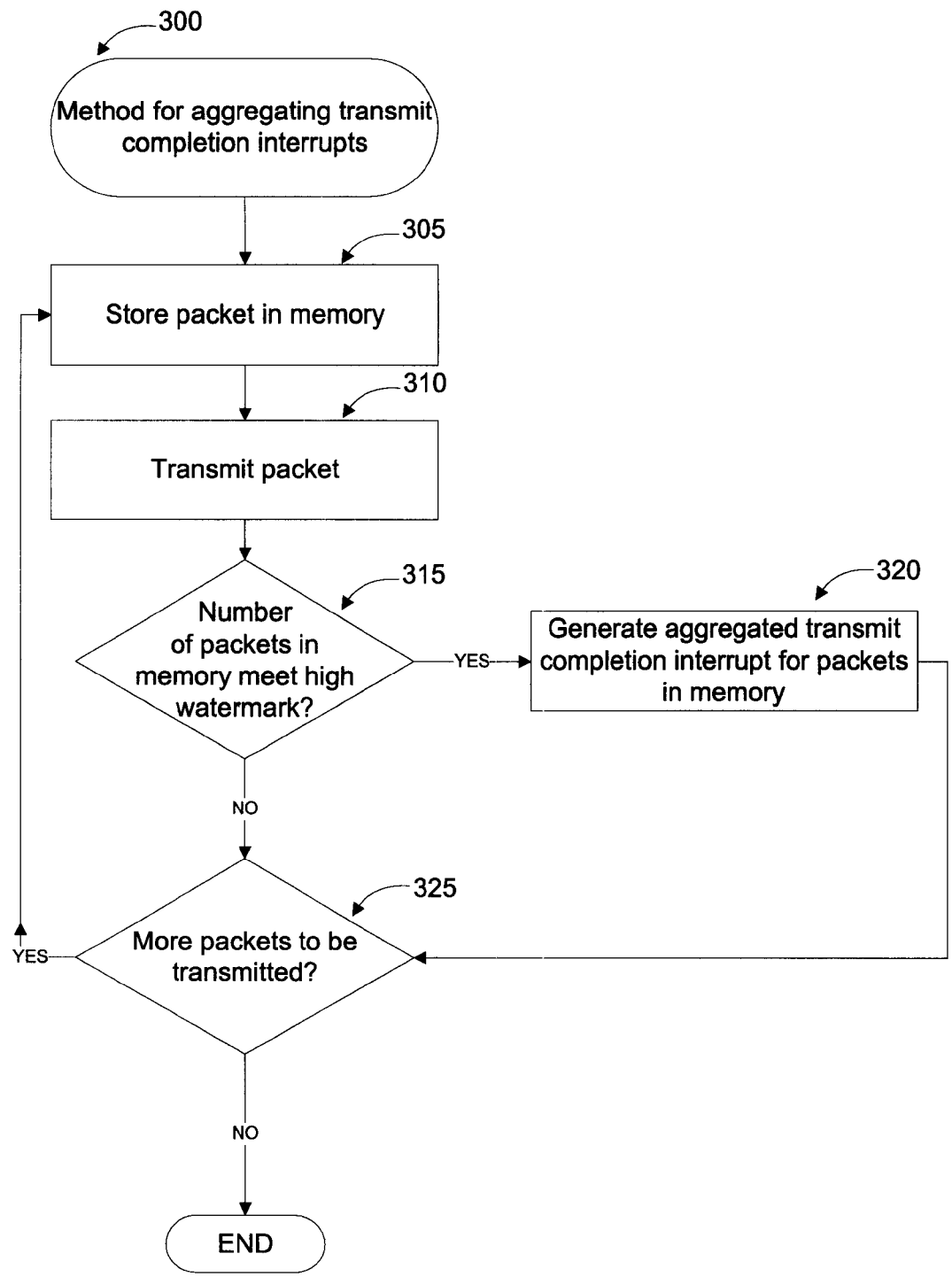
FIG. 3 is a flow chart depicting a method for aggregating transmit completion interrupts, according to an exemplary embodiment.

FIG. 3 is a flow chart depicting a method for aggregating transmit completion interrupts 112, according to an exemplary embodiment. In step 305, a packet 110 is stored in the memory of the host 104. In an exemplary embodiment, the memory includes a ring buffer 118 that can have an array of pointers to memory locations, with each location capable of temporarily storing a packet 110. In a particular exemplary embodiment, the ring buffer 118 can have 64 array cells 108 with 64 pointers to memory locations, and thus can be capable of storing 64 pointers to packets 110 at a given time.

In step 310, the network device 102 transmits a packet 110. In an exemplary embodiment, the network device 102 transmits the packet 110 from the host 104 in the network. The network device 102 can transmit the packet 110 via TCP/IP, or any other suitable network protocol. In another exemplary embodiment, the packet 110 transmitted can contain information that can allow the processor 106 and/or the network device 102 to identify related packets 110 (i.e., other packets 110 that may be from the same data that has been divided into packets 1 10).

In step 315, the method 300 determines whether the high watermark 116 has been met. In an exemplary embodiment, the processor 106 can determine the number of full cells 108A, and then compare the number of full cells 108A to the high watermark 116.

In various exemplary embodiments, the high watermark 116 can be determined either statically or dynamically. In one embodiment, the network device 102 can be programmed—by the manufacturer, operator, or any other party—to have a high watermark 114 of approximately two-thirds of the total number of array cells 108 in the ring buffer 118. Thus, in the example where the ring buffer 118 includes a 64-cell array, the high watermark 116 can be set to 42 cells.

In an alternative embodiment, the network device 102 can be programmed to adjust the high watermark 114 based on the speed of the network. A measure of the network speed can include the rate at which packets 110 are transmitted by the network device 102. In one embodiment, if the network speed is relatively high, then the high watermark 116 can be set at a relatively low level. The relatively low level for the high watermark 116 can be advantageous to avoid overflow in the ring buffer 118 or transmission queue, which would require packets to be resent. In a particular embodiment, instructions for determining the high watermark 114 based on the network speed can be stored in a kernel parameter associated with the network device 102 and/or in an associated host 104.

Regardless of how the high watermark 116 is determined, if the number of full cells 108A in the memory 118 meets or exceeds the high watermark 116, the method 300 branches to step 330. Otherwise, the method 300 branches to step 335.

In step 320, the interrupt handler 114 of the network device 102 generates an aggregated transmit completion interrupt 112 for all packets 110 in the host's 104 memory 118. This can represent to the transmitting host 104 that the network device 102 has transmitted and processed each of the packets 110. After processing the aggregated transmit completion interrupt 112, the network device 102 frees the memory 118 locations storing the packets 110 at one time, in one "chunk.". After step 320, the method 300 proceeds to step 325.

In step 325, the method 300 determines whether more packets 110 will be transmitted by the network device 102. In an exemplary embodiment, the processor 106 of the network device 102 can determine whether at least one additional packet 110 is being transmitted by the network device 102. If more packets 110 will be transmitted by the network device 102, the method 300 returns to step 305, where the next packet 110 is transmitted. Otherwise, the method 300 ends.

The illustrated embodiments utilize a network device 102 that indicates to a host 104 that it has transmitted a packet 110 by a transmit completion interrupt 112. In an alternative exemplary embodiment, a network device 102 may utilize a completion queue and completion signal to indicate to a host 104 that the network device 102 has transmitted and/or processed a given packet 110. In such an embodiment, when a packet 110 has been transmitted and processed, it can be added to the completion queue. If the number of packets 110 in the completion queue meets or exceeds the high watermark 116, the network device 102 can transmit a completion signal to the host 104 (instead of or in addition to a transmit completion interrupt 112). One of ordinary skill in the art having the benefit of the present disclosure will recognize that such a network device 102 can be used with one or more of the exemplary embodiments disclosed herein.

Additionally, though the illustrated embodiments utilize a network device 102 connected to a transmitting host 104 that aggregates transmit completion interrupts 112, in other embodiments, the network device 102 can be connected to a receiving node (not shown) that aggregates receive completion interrupts. In such an embodiment, the network device 102 can include a receiving ring buffer 118 having a low watermark (not shown) and a high watermark 116. In an exemplary embodiment, when the network device 102 receives a packet 110, it can be stored in the memory and references thereto can be stored in the ring buffer 118. The processor 106 can determine whether the number of packets stored 118 in the memory exceeds or meets the high watermark 116. If so, as with the embodiments discussed previously, an interrupt handler 114 can generate a receive completion interrupt for all packets 110 stored in the memory, which can indicate to the receiving node that the packets 110 have been received. In an exemplary embodiment, the network device 102 also can determine whether the number of packets 110 stored in the memory is less than the low watermark (which can indicate that the network speed is relatively low). If so, the receive completion interrupts can be processed individually, so as not to unnecessarily delay the receive completion interrupts in the network with the relatively slow speed. In yet another embodiment, if the number of packets 110 stored in the memory is between the low watermark and the high watermark 116, the network device 102 can wait and continue receiving packets until the high watermark 116 is reached. In an exemplary embodiment, if the high watermark 116 has not been reached in a certain time, a timeout will be generated to process these packets 110.

Moreover, although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A method for aggregating transmit completion interrupts for a network device, comprising the steps of:
   (a) storing a first packet in a host memory for a network device, the network device having a high watermark;
   (b) sending the first packet from a host on a network;
   (c) determining a number of packets stored in the memory;
   (d) comparing the number of packets stored in the memory to the high watermark;
   (e) if the number of packets stored in the memory is greater than or equal to the high watermark, generating an aggregated transmit completion interrupt for all packets stored in the memory to be processed by an interrupt handler for the network device and releasing the memory associated with all packets at one time; and
   (f) if the number of packets stored in the memory is less than high watermark, waiting for additional packets to be sent from the host.

2. The method of claim 1, wherein the high watermark is dynamic and is adjusted based on a speed of the network.

3. The method of claim 1, wherein instructions for adjusting the high watermark are stored in a kernel parameter associated with the network device.

4. The method of claim 1, further comprising the steps of:
   determining a rate for which packets are transmitted by the network device;
   determining whether the rate is high; and
   in response to a determination that the rate is high, reducing the high watermark.

5. The method of claim 1, further comprising the steps of:
   determining a rate for which packets are transmitted by the network device;
   determining whether the rate is low; and
   in response to a determination that the rate is low, increasing the high watermark.

6. The method of claim 1, wherein the high watermark is static.

7. The method of claim 1, wherein the high watermark comprises a value of approximately 67% of the memory.

8. A computer program product for aggregating transmit completion interrupts for a network device, the computer program product comprising:
 a computer-readable storage medium having computer-readable program code embodied therein, the computer-readable program code comprising:
  computer-readable program code for storing a first packet in a host memory for a network device, the network device having a high watermark;
  computer-readable program code for sending the first packet from a host on a network;
  computer-readable program code for determining a number of packets stored in the memory;
  computer-readable program code for comparing the number of packets stored in the memory to the high watermark;
  computer-readable program code for generating an aggregated transmit completion interrupt for all packets stored in the memory to be processed by an interrupt handler for the network device and releasing the memory associated with all packets at one time in response to the number of packets stored in the memory being greater than or equal to the high watermark; and
  computer-readable program code for waiting for additional packets to be sent from the host in response to the number of packets stored in the memory being less than high water mark.

9. The computer program product of claim 8, further comprising computer-readable program code for adjusting the high watermark based on a speed of the network.

10. The computer program product of claim 8, wherein the computer-readable program code for adjusting the high watermark is stored in a kernel parameter associated with the network device.

11. The computer program product of claim 8, wherein the computer-readable program code further comprises:
 computer-readable program code for determining a rate for which packets are transmitted by the network device;
 computer-readable program code for determining whether the rate is high; and
 computer-readable program code for reducing the high watermark in response to a determination that the rate is high.

12. The computer program product of claim 8, wherein the computer-readable program code further comprises:
 computer-readable program code for determining a rate for which packets are transmitted by the network device;
 computer-readable program code for determining whether the rate is low; and
 computer-readable program code for increasing the high watermark in response to a determination that the rate is low.

13. The computer program product of claim 8, wherein the high watermark comprises a constant value.

14. The computer program product of claim 8, wherein the high watermark comprises a value of approximately 67% of the memory.

15. A system for aggregating transmit completion interrupts for a network device, the system comprising:
 a processor, a computer-readable memory, and a computer-readable storage device;
 first program instructions for storing a first packet in a host memory for a network device, the network device having a high watermark;
 second program instructions for sending the first packet from a host on a network;
 third program instructions for determining a number of packets stored in the memory;
 fourth program instructions for comparing the number of packets stored in the memory to the high watermark;
 fifth program instructions for generating an aggregated transmit completion interrupt for all packets stored in the memory to be processed by an interrupt handler for the network device and releasing the memory associated with all packets at one time if the number of packets stored in the memory is greater than or equal to the high watermark; and
 sixth program instructions for waiting for additional packets to be sent from the host if the number of packets stored in the memory is less than high watermark,
 wherein the first, second, third, fourth, fifth, and sixth program instructions are stored on the computer-readable storage device for execution by the processor via the computer-readable memory.

16. The system of claim 15, wherein the high watermark is dynamic and is adjusted based on a speed of the network.

17. The system of claim 15, wherein instructions for adjusting the high watermark are stored in a kernel parameter associated with the network device.

18. The system of claim 15, further comprising:
 seventh program instructions for determining a rate for which packets are transmitted by the network device;
 eighth program instructions for determining whether the rate is high; and
 ninth program instructions for reducing the high watermark in response to a determination that the rate is high.

19. The system of claim 15, further comprising:
 seventh program instructions for determining a rate for which packets are transmitted by the network device;
 eighth program instructions for determining whether the rate is low; and
 ninth program instructions for increasing the high watermark in response to a determination that the rate is low.

20. The system of claim 15, wherein the high watermark comprises a constant value.

* * * * *